(12) United States Patent
Birkmann et al.

(10) Patent No.: US 12,186,813 B2
(45) Date of Patent: Jan. 7, 2025

(54) CUTTING INSERT AND MACHINING TOOL

(71) Applicant: KENNAMETAL INC., Latrobe, PA (US)

(72) Inventors: Fabian Birkmann, Schwaig (DE); Igor Kaufmann, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/362,069

(22) Filed: Jun. 29, 2021

(65) Prior Publication Data

US 2021/0402488 A1    Dec. 30, 2021

(30) Foreign Application Priority Data

Jun. 29, 2020  (DE) .......................... 102020117101.3

(51) Int. Cl.
    *B23B 27/16*    (2006.01)

(52) U.S. Cl.
    CPC ................. *B23B 27/1611* (2013.01)

(58) Field of Classification Search
    CPC ... B23B 27/10; B23B 27/143; B23B 27/1611; B23B 25/02; B23B 27/00; B23C 2200/081; B23C 2200/32; B23C 2200/323; B23C 2200/236; B23C 5/165; B23C 5/28
    See application file for complete search history.

(56) References Cited

U.S. PATENT DOCUMENTS

| | | |
|---|---|---|
| 3,968,550 A | 7/1976 | Gehri |
| 4,215,957 A | 8/1980 | Andersson |
| 4,318,645 A | 3/1982 | McCreery |
| 4,411,565 A | 10/1983 | Hazra et al. |
| 4,441,841 A | 4/1984 | Mori |
| 4,685,844 A | 8/1987 | McCreery et al. |
| 4,969,779 A * | 11/1990 | Barten .................. B23B 27/045 407/115 |
| 5,000,626 A | 3/1991 | Bernadic et al. |
| 5,006,020 A * | 4/1991 | Roos ..................... B23B 27/145 407/120 |
| 5,011,340 A | 4/1991 | Pettersson et al. |

(Continued)

FOREIGN PATENT DOCUMENTS

| | | | |
|---|---|---|---|
| CN | 102317018 A * | 1/2012 | ............ B23B 27/14 |
| CN | 106312113 A | 1/2017 | |

(Continued)

OTHER PUBLICATIONS

CN-102317018-A Machine Translation (Year: 2023).*

(Continued)

*Primary Examiner* — Nicole N Ramos

(74) *Attorney, Agent, or Firm* — Christopher J. Owens

(57) ABSTRACT

A cutting insert for a machining tool having a cutting edge and a flute extending along the cutting edge is described. A chip breaker element which projects into the interior of the flute is disposed in the flute. Said chip breaker element comprises a chip guiding surface and each point of the chip guiding surface has a spacing from a flute contour that is greater than zero. The chip guiding surface furthermore either extends parallel to the flute contour and/or curved along two directions. A machining tool having such a cutting insert is presented as well.

16 Claims, 7 Drawing Sheets

(56) References Cited

U.S. PATENT DOCUMENTS

| | | | |
|---|---|---|---|
| 5,044,839 A | 9/1991 | Takahashi | |
| 5,056,963 A * | 10/1991 | Kameno | B23B 27/145 |
| | | | 29/90.01 |
| 5,203,649 A | 4/1993 | Katbi et al. | |
| 5,215,415 A * | 6/1993 | Fukuoka | B23B 27/143 |
| | | | 407/119 |
| 5,221,164 A | 6/1993 | Allaire | |
| 5,222,843 A | 6/1993 | Katbi | |
| 5,249,894 A | 10/1993 | Bernadic et al. | |
| 5,372,463 A | 12/1994 | Takahashi et al. | |
| 5,437,522 A | 8/1995 | Satran et al. | |
| 5,449,255 A * | 9/1995 | Katbi | B23B 27/143 |
| | | | 407/115 |
| 5,456,557 A * | 10/1995 | Bernadic | B23B 27/143 |
| | | | 407/115 |
| 5,549,424 A | 8/1996 | Bernadic et al. | |
| 5,577,867 A | 11/1996 | Paya | |
| 5,688,081 A | 11/1997 | Paya | |
| 5,704,737 A | 1/1998 | Alford | |
| 5,722,803 A | 3/1998 | Battaglia et al. | |
| 5,743,681 A | 4/1998 | Wiman et al. | |
| 5,758,994 A * | 6/1998 | Hintze | B23B 27/141 |
| | | | 407/115 |
| 5,772,365 A | 6/1998 | Vogel et al. | |
| 5,791,832 A | 8/1998 | Yamayose | |
| 5,876,154 A | 3/1999 | Enderle | |
| 5,921,722 A * | 7/1999 | Paya | B23B 27/143 |
| | | | 407/115 |
| 5,924,824 A | 7/1999 | Satran et al. | |
| 6,164,878 A | 12/2000 | Satran et al. | |
| 6,186,705 B1 | 2/2001 | Kumar et al. | |
| 6,234,726 B1 * | 5/2001 | Okada | B23B 27/143 |
| | | | 407/115 |
| 6,241,430 B1 * | 6/2001 | Norstrom | B23B 27/143 |
| | | | 407/115 |
| 6,267,541 B1 * | 7/2001 | Isakov | B23B 27/143 |
| | | | 407/115 |
| 6,447,218 B1 * | 9/2002 | Lagerberg | B23B 27/10 |
| | | | 407/115 |
| 6,599,061 B1 | 7/2003 | Nelson | |
| 7,341,408 B2 | 3/2008 | Kratz | |
| 7,438,508 B2 * | 10/2008 | Alm | B23B 27/145 |
| | | | 407/115 |
| 7,455,483 B2 | 11/2008 | Koskinen | |
| 7,758,287 B2 * | 7/2010 | Alm | B23C 5/202 |
| | | | 407/115 |
| 8,342,779 B2 | 1/2013 | Kobayashi | |
| 8,585,330 B2 | 11/2013 | Yamazaki et al. | |
| 8,616,810 B2 * | 12/2013 | Kaufmann | B23B 27/143 |
| | | | 407/115 |
| 8,690,496 B2 | 4/2014 | Komatsuka | |
| 8,702,354 B2 | 4/2014 | Schleinkofer et al. | |
| 8,777,525 B2 | 7/2014 | Löf | |
| 8,814,480 B2 | 8/2014 | Cohen | |
| 8,967,920 B2 * | 3/2015 | Krishtul | B23B 27/143 |
| | | | 407/115 |
| 8,997,610 B2 * | 4/2015 | Ishida | B23C 5/06 |
| | | | 407/113 |
| 9,278,395 B2 | 3/2016 | Matsuo et al. | |
| 9,302,326 B2 * | 4/2016 | Höfermann | B23B 27/1614 |
| 9,409,237 B2 * | 8/2016 | Majima | B23B 27/1607 |
| 9,511,422 B2 | 12/2016 | Scherman et al. | |
| 9,586,264 B2 | 3/2017 | Dufour et al. | |
| 9,707,625 B2 * | 7/2017 | Onodera | B23B 27/22 |
| 10,076,788 B2 | 9/2018 | Krishtul | |
| 10,286,455 B2 * | 5/2019 | Tomoda | B23B 27/20 |
| 10,442,006 B2 | 10/2019 | Inoue | |
| 2002/0159846 A1 | 10/2002 | Horiike et al. | |
| 2005/0019111 A1 | 1/2005 | Kitagawa et al. | |
| 2005/0244232 A1 | 11/2005 | Jonsson | |
| 2006/0188347 A1 | 8/2006 | Kratz | |
| 2006/0228179 A1 | 10/2006 | Alm et al. | |
| 2007/0071559 A1 | 3/2007 | Koskinen | |
| 2007/0166545 A1 | 7/2007 | Tanibuchi et al. | |
| 2008/0193231 A1 * | 8/2008 | Jonsson | B23B 27/1618 |
| | | | 407/11 |
| 2008/0219784 A1 * | 9/2008 | Yamazaki | B23B 27/143 |
| | | | 407/114 |
| 2008/0253848 A1 | 10/2008 | Alm et al. | |
| 2008/0292415 A1 * | 11/2008 | Kuroda | B23B 27/145 |
| | | | 83/53 |
| 2010/0003089 A1 | 1/2010 | Horiike | |
| 2010/0275749 A1 | 11/2010 | Kobayashi | |
| 2011/0020073 A1 * | 1/2011 | Chen | B23B 27/164 |
| | | | 407/103 |
| 2011/0033252 A1 | 2/2011 | Nishida | |
| 2011/0070039 A1 | 3/2011 | Park et al. | |
| 2011/0070040 A1 | 3/2011 | Park et al. | |
| 2011/0142555 A1 | 6/2011 | Yamazaki et al. | |
| 2012/0128438 A1 * | 5/2012 | Tanaka | B23B 27/141 |
| | | | 407/115 |
| 2012/0170987 A1 | 7/2012 | Komatsuka | |
| 2012/0198973 A1 | 8/2012 | Schleinkofer et al. | |
| 2012/0308318 A1 | 12/2012 | Burtscher | |
| 2013/0064613 A1 | 3/2013 | Krishtul | |
| 2013/0094914 A1 | 4/2013 | Majima | |
| 2013/0236258 A1 | 9/2013 | Nada et al. | |
| 2013/0251468 A1 | 9/2013 | Lof | |
| 2013/0272808 A1 | 10/2013 | Cohen | |
| 2014/0286717 A1 | 9/2014 | Lof et al. | |
| 2014/0286718 A1 | 9/2014 | Scherman et al. | |
| 2015/0063926 A1 * | 3/2015 | Wu | B23B 51/06 |
| | | | 407/11 |
| 2015/0336175 A1 | 11/2015 | Krishtul | |
| 2017/0320143 A1 | 11/2017 | Lof | |
| 2018/0169767 A1 | 6/2018 | Inoue | |
| 2018/0257146 A1 | 9/2018 | Deguchi et al. | |
| 2019/0314901 A1 | 10/2019 | Sakai | |
| 2021/0008637 A1 * | 1/2021 | Nagae | B23B 27/143 |

FOREIGN PATENT DOCUMENTS

| | | | |
|---|---|---|---|
| DE | 10308234 A1 | 9/2004 | |
| EP | 2570211 A4 | 7/2014 | |
| GB | 2093379 A | 9/1982 | |
| JP | H10118810 A | 12/2001 | |
| JP | 5260924 B2 | 8/2013 | |
| WO | WO9939853 | 8/1999 | |
| WO | WO2009005218 A1 | 1/2009 | |
| WO | WO2013038405 A1 | 3/2013 | |
| WO | WO2018042957 A1 | 3/2018 | |
| WO | WO-2019189406 A1 * | 10/2019 | B23B 27/143 |

OTHER PUBLICATIONS

Aug. 23, 2022 Office action (3 months) (US Only) US App. No. 20220097145.

Mar. 16, 2023 Non-Final Office Action U.S. Appl. No. 17/490,300, 6 Pages.

Aug. 2, 2023 Foreign Office Action Chinese Application No. CN20211179274, 2 Pages.

May 4, 2023 Foreign Office Action Chinese Application No. CN202110690566.1, 2 Pages.

Sep. 13, 2023 Notice of Allowance for U.S. Appl. No. 17/490,300, 7 Pages.

\* cited by examiner

CUTTING INSERT AND MACHINING TOOL

RELATED APPLICATION DATA

The present application claims priority pursuant to 35 U.S.C. § 119(a) to German Patent Application Number 102020117101.3 filed Jun. 29, 2020 which is incorporated herein by reference in its entirety.

FIELD

The invention relates to a cutting insert for a machining tool having a cutting edge and a flute which extends along the cutting edge, whereby a chip breaker element which projects into the interior of the flute is disposed in the flute.

The invention further relates to a machining tool, in particular a turning tool, comprising such a cutting insert.

BACKGROUND

Such machining tools and cutting inserts are known from the state of the art. These are typically designed such that the flute separates the cutting edge from a fastening portion of the cutting insert. In other words, the flute is disposed between the cutting edge and a fastening portion of the cutting insert as a trench-like depression. It goes without saying that the flute is disposed on the same side of the cutting edge as the rake face.

A chip breaker element is typically used to create a multidimensional stress state within a chip lifted from a workpiece by means of the cutting insert, so that the chip breaks.

Of course, the chip breaker element may only offer a comparatively low resistance to the chip flow directed away from the workpiece, so that the chip breaker element does not prevent the chips from flowing away from the workpiece. Chip breaker elements have to therefore always be designed for the stress field of good chip breaking, which is facilitated by comparatively large chip breaker elements, and reliable chip evacuation from the workpiece, which is facilitated by comparatively small chip breaker elements.

SUMMARY

The object of the invention is to further improve such cutting inserts and associated machining tools. The intent is to eliminate or at least mitigate the conflict of objectives between reliable chip breaking and low-resistance chip evacuation. A cutting insert is therefore to be specified by means of which the chips can easily be guided away from a machined workpiece, while at the same time being reliably broken.

The object is achieved by a cutting insert of the abovementioned type, in which the chip breaker element comprises a chip guiding surface and each point of the chip guiding surface has a spacing from a flute contour that is greater than zero. The chip guiding surface furthermore either extends parallel to the flute contour and/or curved along two directions. In other words, the chip guiding surface of the chip breaker element is raised from the flute contour. Of course, the chip guiding surface can merge into the flute contour via one or more transition surfaces. However, the transition surfaces have to then be designed such that at least some points of the transition surfaces coincide with the flute contour. These points are therefore not spaced apart from the flute contour and are consequently not to be regarded as chip guiding surfaces. A parallel course of the chip guiding surface to the flute contour can be seen particularly well when looking at the chip guiding surface along a course direction of the flute. The spacing between the chip guiding surface and the flute contour is then constant. If the flute contour is curved, the chip guiding surface in that variant is curved as well. If the chip guiding surface is alternatively or additionally curved along a second direction, this curvature preferably occurs with reference to a straight line oriented along the course of the flute. In this context, a curvature is understood to be a deviation from a straight course. Such chip breaker elements present only a comparatively low resistance to chip flow. The chips can thus flow away from the workpiece to be machined comparatively easily. At the same time, the chip guiding surface can create a multidimensional stress state within the chips, so that they break in the desired manner. The abovementioned conflict is thus resolved or at least mitigated.

Of course, in this context, it is not excluded for the cutting insert according to the invention to additionally be equipped with further chip breaker elements which may be known per se. Such chip breaker elements can be disposed inside the flute. This can further boost the breaking of the chips.

The cutting edge of the cutting insert can be straight or curved.

In one embodiment, the chip breaker element is spaced apart from a cutting edge-side edge of the flute. The chip breaker element therefore does not extend to the cutting edge-side edge of the flute. An influence of the chip breaker element on the machining process is thus excluded or at least kept to a minimum. This is in particular true for the undisturbed flow of chips out of the machining zone.

In plan view, the chip breaker element can include an angle of less than 90° with the cutting edge. In other words, the chip breaker element is inclined relative to the cutting edge. It is thus particularly easy to create a multidimensional stress state within the chips so that they break in the desired manner. This moreover defines a direction along which the chips are discharged from the machining zone.

The cutting edge preferably connects two corners of the cutting insert. The corners, too, can be used for machining. The cutting insert in particular comprises three or more corners, which are respectively connected to a cutting edge in pairs.

According to one variant, a chip guide finger is provided in an end region of the flute adjoining one of the corners and is positioned in the flute. The chip guide finger is curved in both plan view and in a view along the course of the flute. The chip guide finger also serves to guide chips out of the process zone. The chip guide finger furthermore deforms the chips. A multidimensional stress state can thus be created in the chips to cause them to break. If cutting edges with flutes exist on both sides of a corner, chip guiding fingers can be provided in both end regions of the respective flutes adjoining the corner. In that case, the chip guide fingers can be implemented as a double finger element.

The chip guide finger is advantageously positioned closer to the associated corner than the chip breaker element. The chip guide fingers and the chip breaker element are thus disposed along the cutting edge with a specific spacing. The chips can thus easily be discharged and caused to break along the entire cutting edge.

The chip guide finger can furthermore have a smaller spacing to the cutting edge than the chip breaker element. This, too, serves to reliably discharge and break the chips.

At least one first chamfer can be provided at the transition from the cutting edge to the flute. Such a chamfer can be referred to as a protective chamfer. Its purpose is to transfer tensile stresses into compressive stresses in the rake face-side region of the cutting edge and thus protect the cutting edge from high cutting forces. This results in a long service life for the cutting insert.

To that end, the first chamfer can have a chamfer angle of −2° to 6° and/or a chamfer width of 0.05 mm to 0.5 mm.

A second chamfer, which is separate from the first chamfer, or a transition radius can be provided at the transition from the cutting edge to the flute as well. Thus, in a first variant, two chamfers are provided between the cutting edge and the flute which differ in particular in terms of their angle and/or in terms of their width. In a second variant, a chamfer and a transition radius are provided. This makes it possible to achieve a particularly smooth transition between the cutting edge and the flute.

A chamfer angle of the second chamfer can be in the range from −2° to 6°.

A chamfer width of the second chamfer can be in a range from 0.05 mm to 0.5 mm.

A size of the transition radius preferably results from the fact that it merges tangentially into adjoining surfaces on both sides. The size of the transition radius can change along the cutting edge, depending on the course of the surfaces to be connected.

In one embodiment, a chamfer angle and/or a chamfer width of the first chamfer and/or a chamfer angle and/or a chamfer width of the second chamfer changes or change along the cutting edge. In the event that the chamfer angles overall are in the negative range, the chamfer angle is preferably more positive in the region of the corner in order to reduce cutting forces, and more negative in the central region of the cutting edge in order to stabilize the cutting edge. This results in a good compromise between a long service life for the cutting insert and a high machining performance.

An edge delimiting the first chamfer and/or the second chamfer can be rounded. This results in a smooth transition between the cutting edge and the flute.

The rounding can have a radius of 0.2 mm to 1 mm.

In an alternative, a deflection channel for coolant is provided on an upper side of the cutting insert in an installed position of the cutting insert. Consequently, coolant can be directed into the machining zone and/or onto the cutting edge via the deflection channel. As a result, a high cooling capacity can be achieved. This applies in particular to cutting depths of more than 1.5 mm.

In this context, the deflection channel in particular comprises at least one deflection geometry by means of which a jet of coolant can be deflected. To do this, the jet has to hit the deflection geometry. A wall of the deflection channel, for example, represents such a deflection geometry. Said wall is then disposed at a specific angle, non-parallel to a jet direction. In such a case, the deflection channel must in particular be distinguished from a clearance, which serves only to allow a jet of coolant to pass as freely as possible.

An outlet-side end of the deflection channel can then be directed toward the cutting edge. The deflection channel can therefore be used to direct coolant onto the cutting edge in order to cool it in a targeted manner. This also takes place in particular outside a region of a corner of the cutting insert.

Alternatively or additionally, a central axis of the outlet-side end of the deflection channel can extend parallel to a tangent to the chip breaker element. Coolant can therefore be introduced comparatively directly into a machining zone for cooling, whereby regions spaced apart from a corner and an associated corner radius can preferably be cooled as well. This also creates a kind of lubricating film on the chip breaker element, which reduces friction and wear as the chips slide off the chip breaker element.

The cutting insert is preferably an indexable insert. The cutting insert then comprises a plurality of cutting edges and a plurality of corners. Such an indexable insert is polygonal, for example.

The object is further achieved by a machining tool of the abovementioned type, which comprises a cutting insert according to the invention. The effects and advantages already mentioned with regard to the cutting insert result for the cutting tool as well.

BRIEF DESCRIPTION OF THE DRAWINGS

The invention is explained below with the aid of different design examples, which are shown in the accompanying drawings. The figures show.

DETAILED DESCRIPTION

Figure 1:
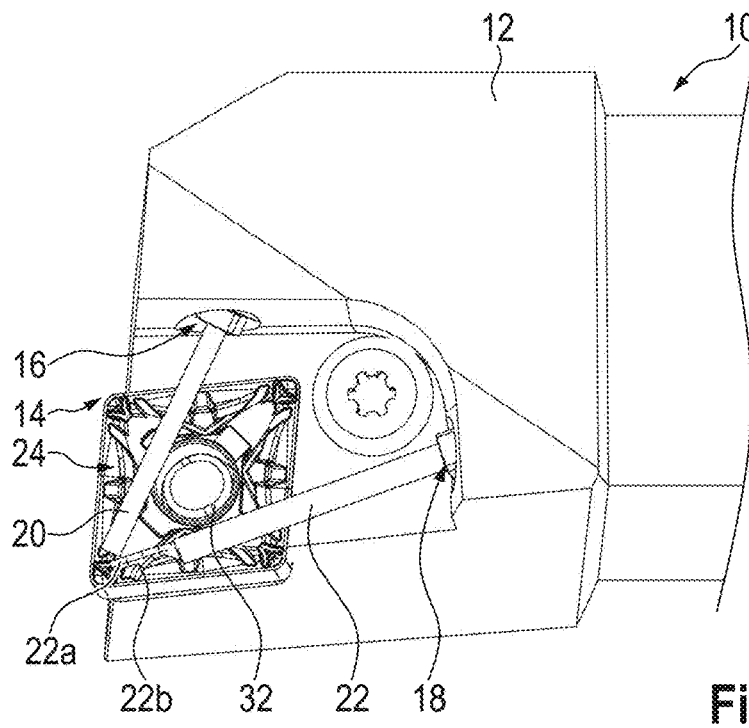
FIG. 1 a machining tool according to the invention comprising a cutting insert according to the invention in a perspective view, FIG. 2 the cutting insert of FIG. 1 in an isolated perspective view, FIG. 3 the cutting insert of FIG. 2 in a view onto an upper side, FIG. 4 the cutting insert of FIG. 2 in a view onto an underside of the cutting insert, FIG. 5 the cutting insert of FIGS. 2 to 4 in a side view along the direction V in FIG. 3, FIG. 6 the cutting insert of FIGS. 2 to 5 in a side view along the direction VI in FIG. 3, FIG. 7 an enlarged section VII of the cutting insert of FIG. 2, FIG. 8 the section of FIG. 7 in plan view, FIG. 9 the section of FIG. 7 in a different perspective view, FIG. 10 a detail view of a chip breaker element of the cutting insert of FIG. 2, FIG. 11 another detail view of the chip breaker element of FIG. 10, FIG. 12 a detail view of a chip breaker element according to an alternative, and FIG. 13 another detail view of the chip breaker element of FIG. 12.
Figure 2:
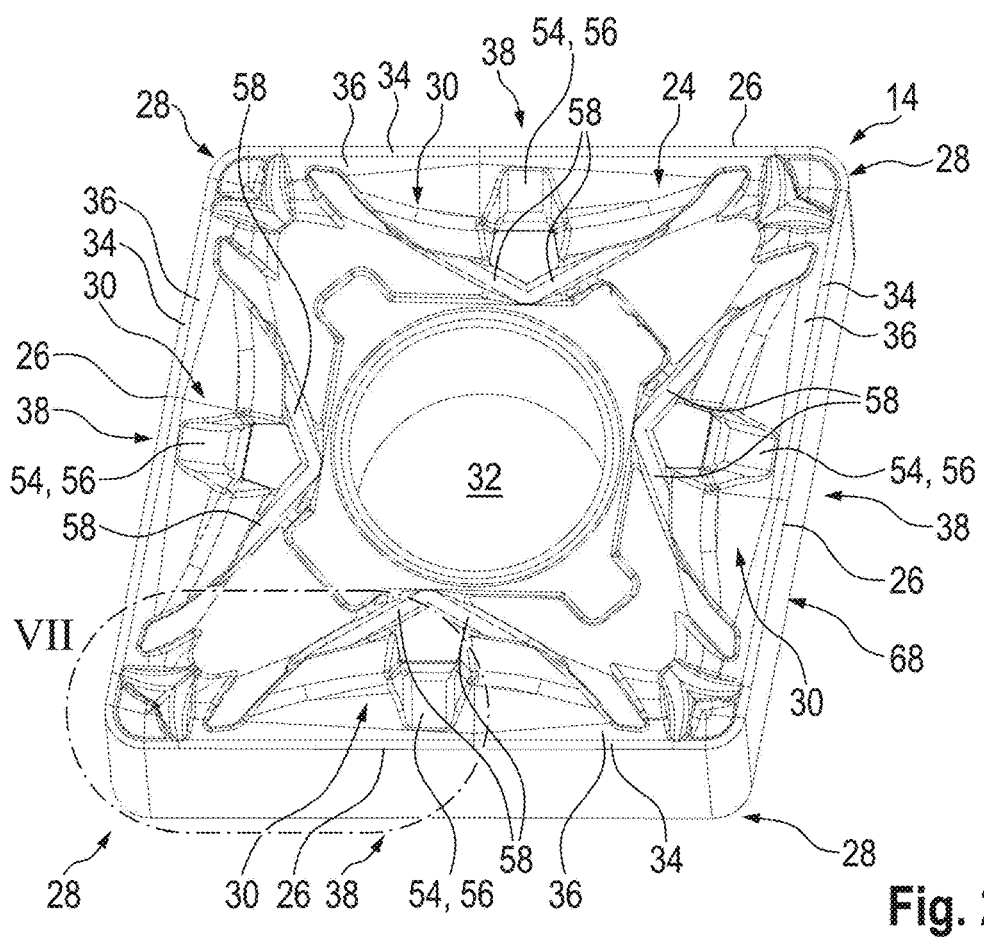
Figure 3:
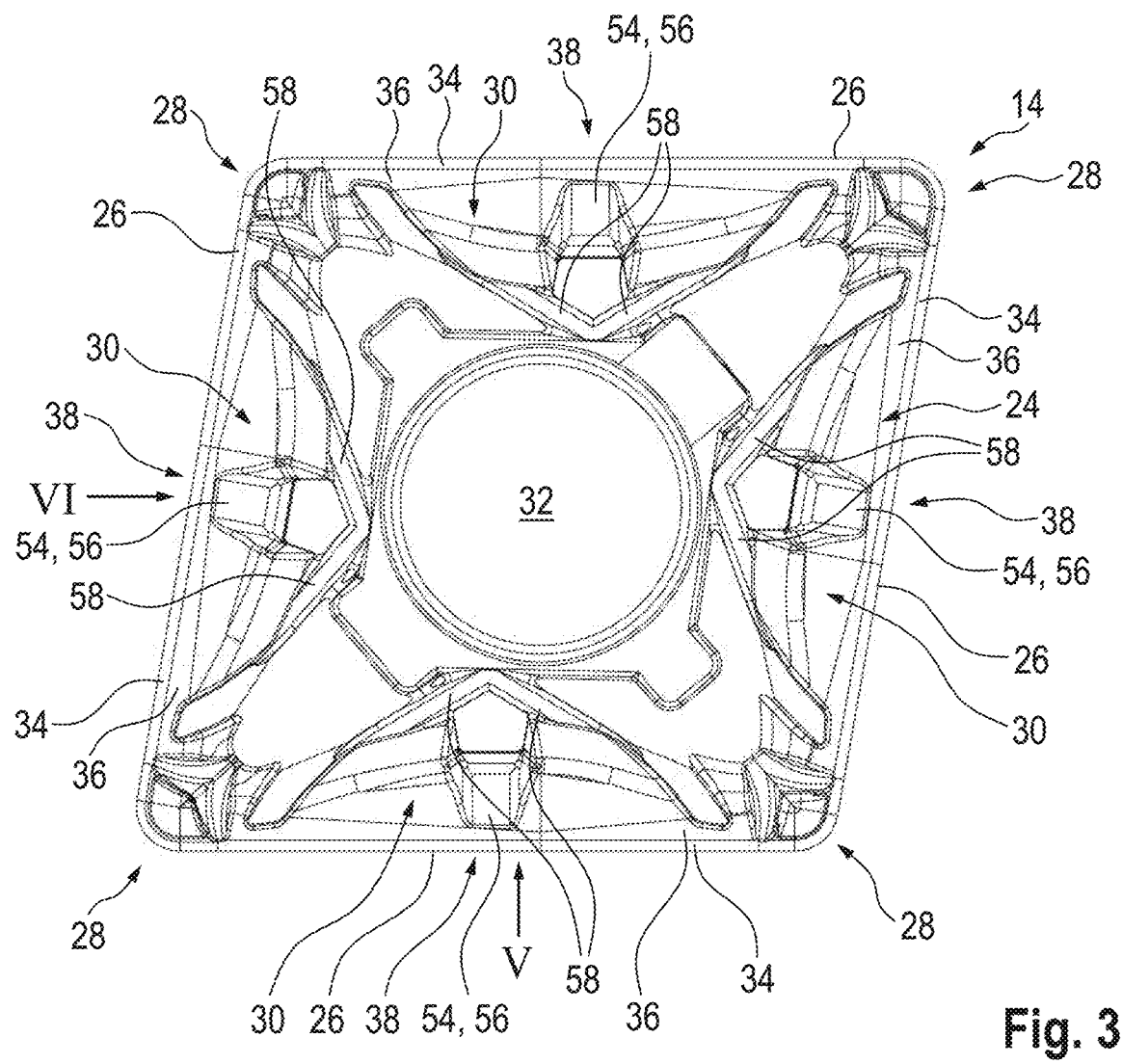
Figure 4:
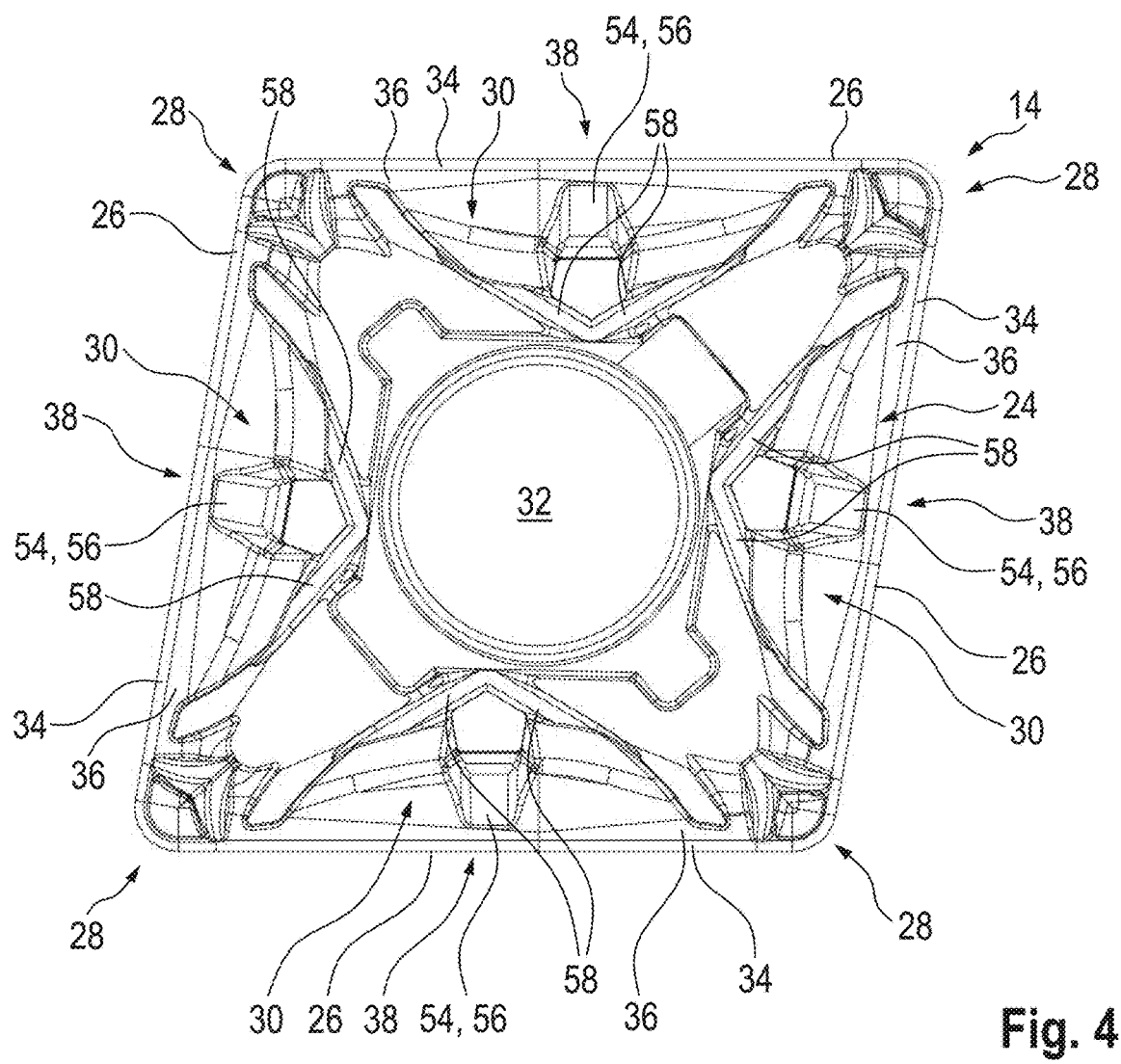
Figure 5:
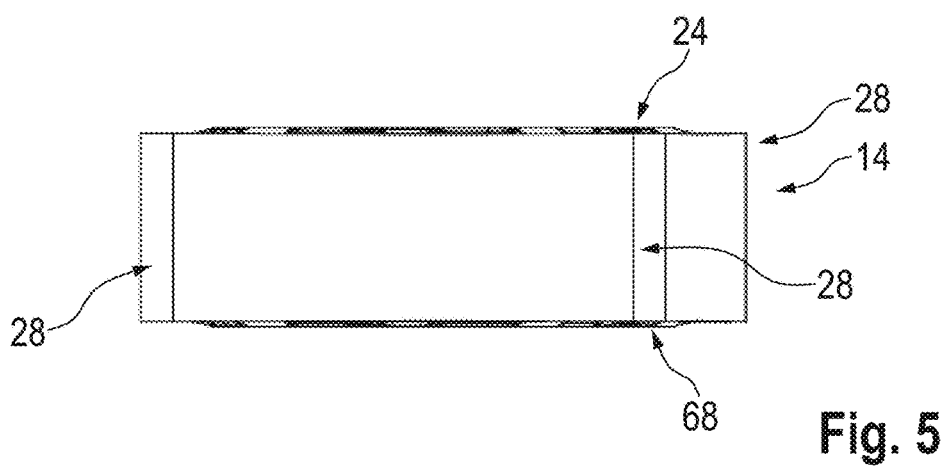
Figure 6:
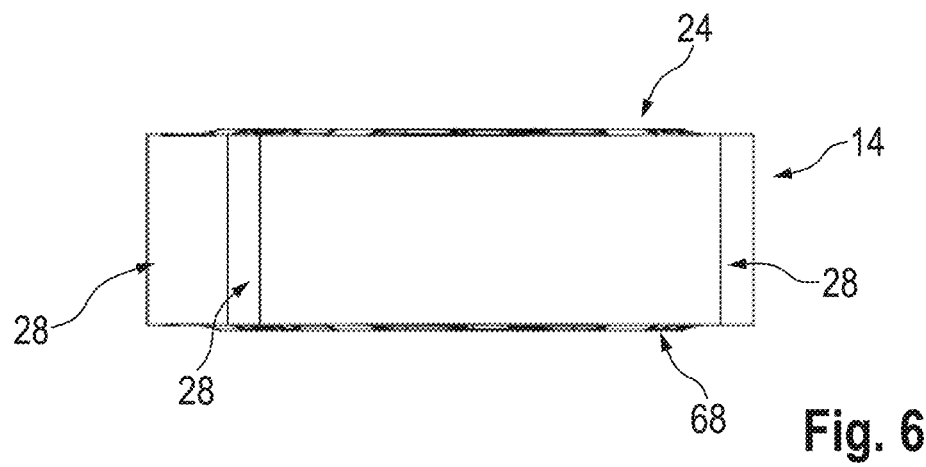
Figure 7:
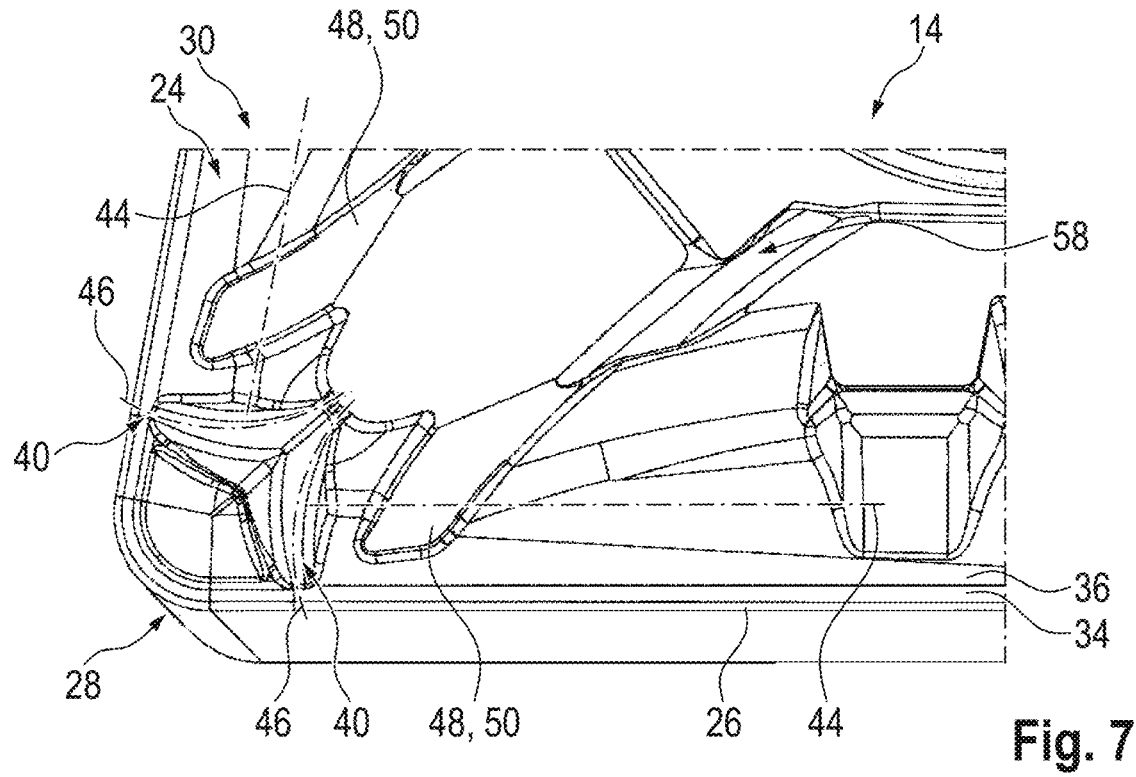
Figure 8:
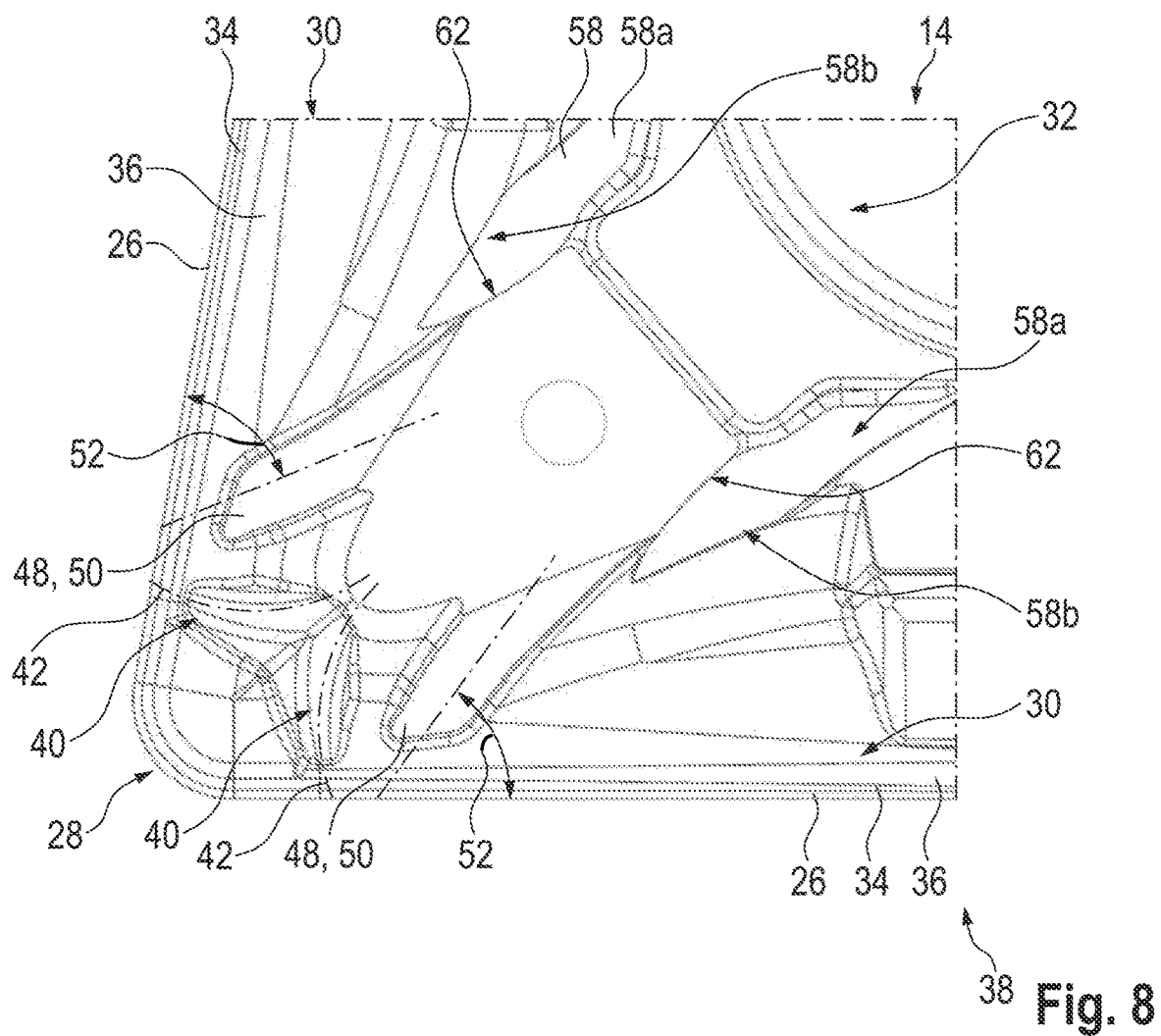
Figure 9:
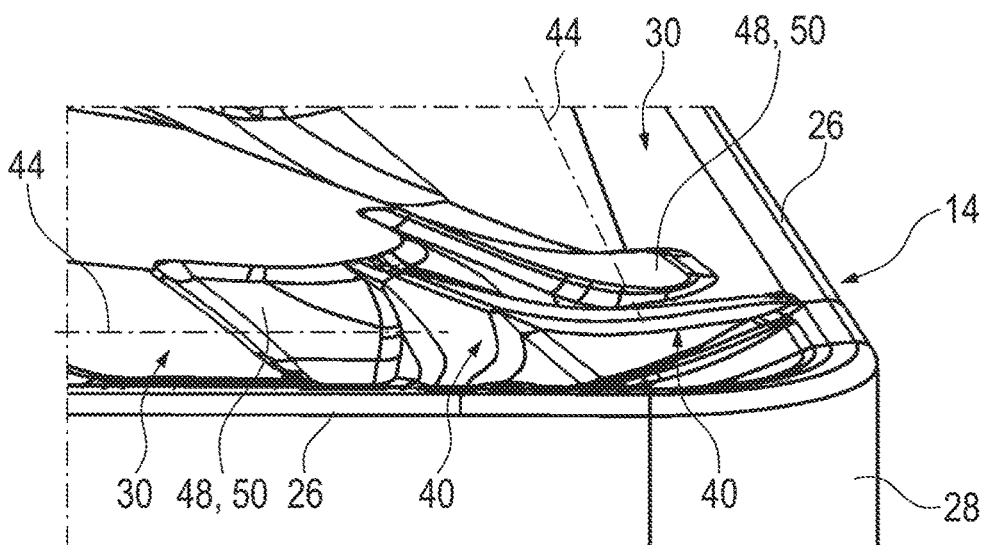
Figure 10:
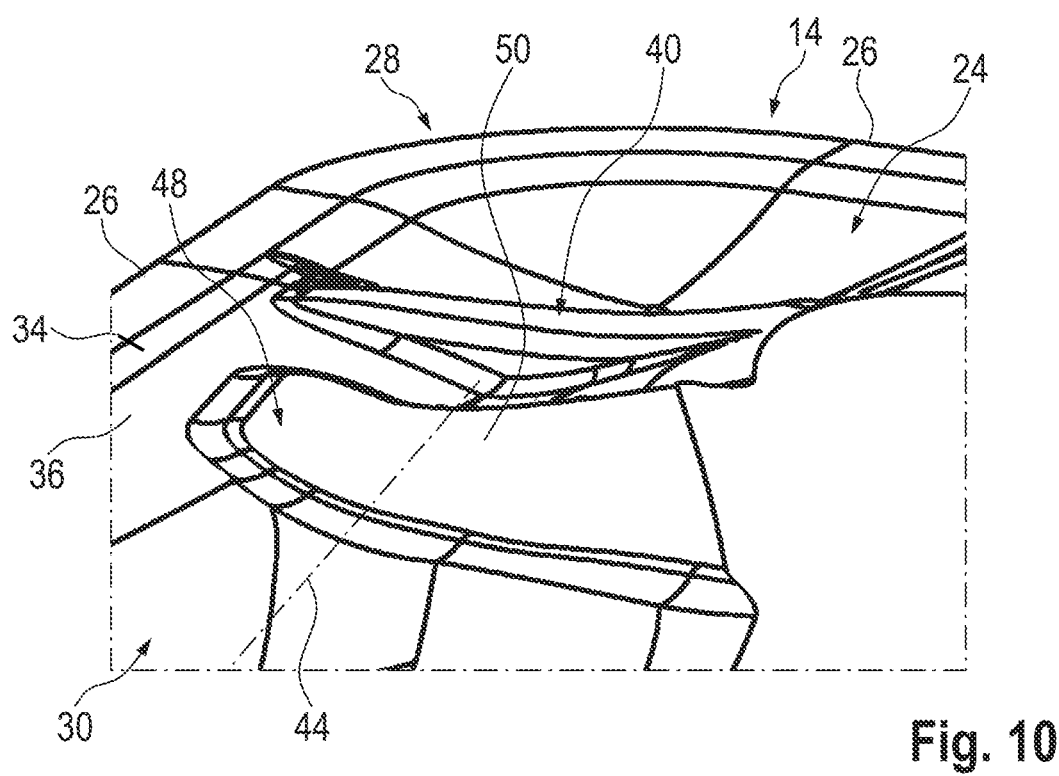
Figure 11:
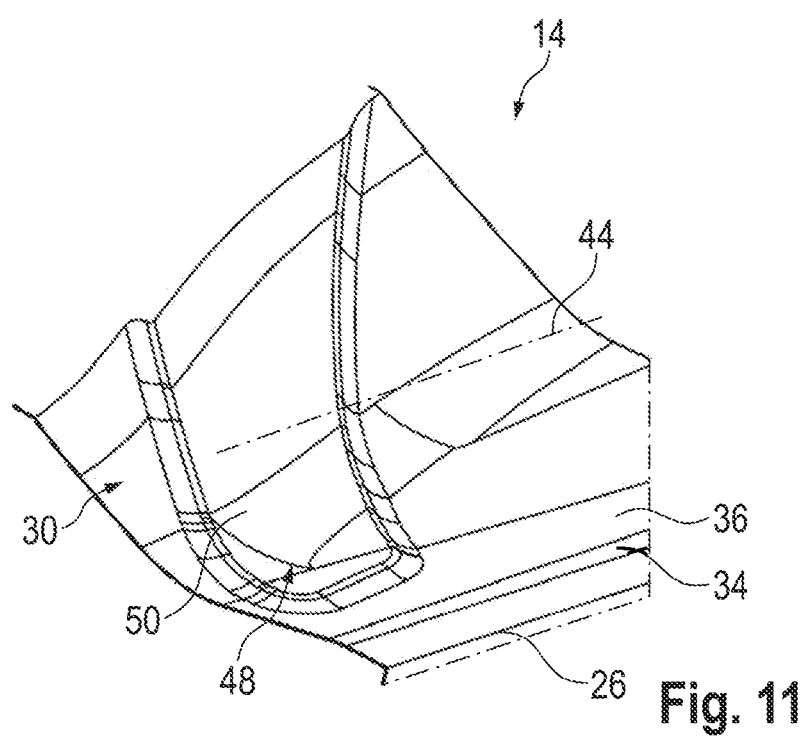

FIG. 1 shows a machining tool 10, which in the embodiment shown is a turning tool.

The machining tool 10 comprises a tool holder 12, to which a cutting insert 14 is attached.

The cutting insert 14 here is implemented as an indexable insert, which is diamond shaped in plan view.

Two outlet openings 16, 18 for coolant are additionally provided on the tool holder 12. These openings are oriented such that a respective exiting coolant jet 20, 22 is directed toward the cutting insert 14. As will be explained later, the cutting insert 14 is configured such that at least the coolant jet 22 divides into a first coolant subjet 22a and a second coolant subjet 22b.

The cutting insert 14 has a total of four cutting edges 26 on its upper side 24, which respectively connect adjacent corners 28 to one another.

A flute 30 disposed as a depression in the region of a rake face of the cutting edge 26 extends along each one of the cutting edges 26.

The flutes 30 are therefore respectively positioned between an associated cutting edge 26 and a central fastening opening 32 of the cutting insert 14.

Since all four cutting edges 26 and the associated flutes 30 are configured in the same way in the shown example, there is no need to distinguish between them in the following.

A first chamfer 34 and a second chamfer 36, which are separate from one another, are provided at the transition of the cutting edge 26 to the associated flute 30.

The edges delimiting the chamfers 34, 36 are rounded.

The first chamfer 34 in the shown design example has a chamfer angle that is substantially constant over the entire length of the associated cutting edge 26.

The same applies to a chamfer width of the first chamfer 34. This, too, is substantially constant along the entire length of the associated cutting edge 26.

Of course, in this context it is also possible for the chamfer angle and/or the chamfer width to change along the cutting edge 26, i.e. not be constant.

In the region of the corners 28 delimiting the associated cutting edge 26, the second chamfer 36 is respectively implemented with a first chamfer angle that differs from a second chamfer angle assumed by the second chamfer 36 in a central region 38.

The second chamfer 36 slopes more steeply toward the associated flute 30 in the region of the corners 28 than in the central region 38. In other words, the first chamfer angle is larger than the second chamfer angle in terms of magnitude.

Since, in accordance with the customary designations, both the first chamfer angle and the second chamfer angle assume negative values, the second chamfer angle, i.e. the chamfer angle in the central region 38, can be described as being more positive than the first chamfer angle, i.e. the chamfer angle in the region of the corners 28.

A chamfer width of the second chamfer 36 also changes along the associated cutting edge 26. The second chamfer 36 has a greater chamfer width in the region of the corners 28 than in the central region 38.

In this context, both the chamfer angle and the chamfer width change continuously along the associated cutting edge 26.

In other not shown examples, the second chamfer angle can alternatively be greater in terms of magnitude than the first chamfer angle.

The cutting insert 14 is equipped with various elements for guiding and breaking chips.

These will be explained in the following with reference to FIGS. 7 to 11, which show the region of a corner 28 of the cutting insert 14 as an example. The other corner regions are configured in the same way.

A chip guide finger 40 is disposed in an end region of the flute 30 adjoining a corner 28 delimiting the cutting edge 26.

Starting from a flute contour of the flute 30, it has a height of 0.02 mm to 0.3 mm.

It is furthermore curved in plan view, i.e. in a view onto the upper side 24. This is symbolized by the indicated line of curvature 42 in FIG. 8.

An associated radius of curvature is in the range from 0.8 mm to 6 mm.

The chip guide finger 40 is furthermore also curved in a view along a course 44 of the associated flute 30. This is symbolized by the indicated line of curvature 46 in FIG. 7.

An associated radius of curvature can be 1 mm to 3 mm.

It goes without saying that the contour of the chip guide finger 40 can also be composed of a plurality of curves.

The chip guide finger 40 serves to direct chips away from a workpiece to be machined. The chip guide finger 40 moreover creates multidimensional stress states within the chips to be guided away so that they break.

A chip breaker element 48 is further provided on a side of the chip guide finger 40 opposite to the respective associated corner 28.

The chip breaker element 48 is likewise disposed in the flute 30 and projects into the interior of the flute 30.

The chip breaker element 48 comprises a chip guiding surface 50 which is raised from a flute contour defining the flute 30.

This means that each point of the chip guiding surface 50 has a spacing from the flute contour that is greater than zero. This is in particular visible in a view along the course 44 of the associated flute 30.

The flute contour is understood to be the entirety of the surfaces defining the geometry of the flute 30. The flute contour of the flute 30 therefore in particular includes a flute base and flute walls.

In the embodiment shown in FIGS. 1 to 11, the chip guiding surface 50 extends parallel to the associated flute contour.

This means that each point of the chip guiding surface 50 has substantially the same spacing from the flute contour of the flute 30, whereby the flute contour is imagined to continue underneath the chip guiding surface 50.

This spacing can be 0.02 mm to 0.1 mm.

The chip breaker element 48 starts at an edge of the flute 30 facing away from the cutting edge 26 and ends with a specific spacing from a cutting edge-side edge of the flute 30.

In plan view, the chip breaker element 48 furthermore includes an angle 52 of substantially 50° with the cutting edge 26.

The cutting insert 14 also comprises another chip breaker element 54 in the central region 38, which includes a chip guiding surface 56.

In contrast to the chip breaker element 54, however, the chip guiding surface 56 now extends from the flute contour of the flute 30 in a substantially ramp-like manner.

The chip breaker elements 48, 54 also serve to place chips into a multidimensional stress state that promotes their breaking.

The cutting insert 14 is further provided with deflection channel 58 for coolant.

These are disposed on the upper side 24.

The deflection channels 58 each comprise a first end 58*a* that faces the respective associated outlet opening 16, 18 and a second end 58*b* that faces the respective associated cutting edge 26.

The first end 58*a* can therefore also be referred to as the inlet-side end and the second end 58*b* can be referred to as the outlet-side end.

The outlet-side end 58*b* is directed toward the cutting edge 26.

A central axis of the deflection channels 58 at the outlet-side end 58*b* moreover extends substantially parallel to a tangent to the chip breaker element 48.

The coolant can thus flow past the chip breaker element 48 substantially unhindered.

In the embodiment shown, a wall 62 of the deflection channel 58 further serves to deflect a portion of the coolant jet 20, 22 (see also FIG. 1).

The first coolant subjet 22*a* is thus directed toward the corner 28 and a second coolant subjet 22*b* is directed toward a region of the cutting edge 26 spaced apart from the corner 28.

Figure 12:
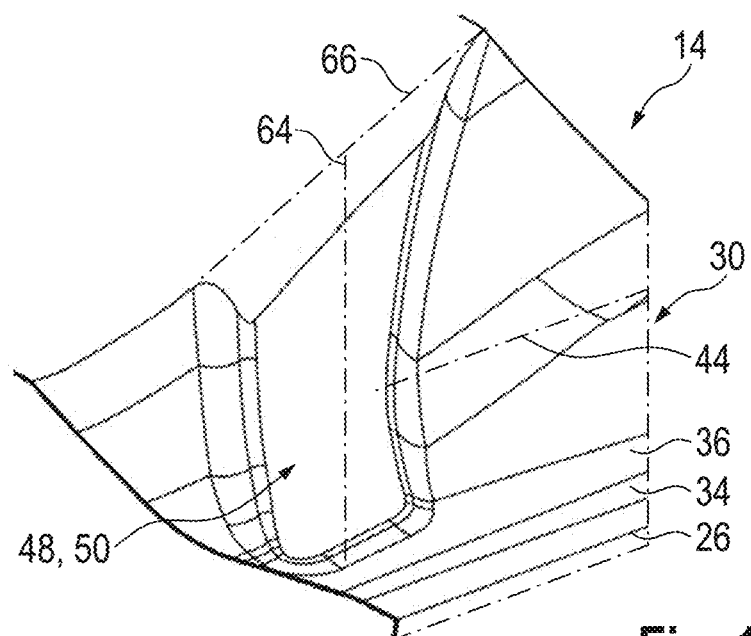
Figure 13:
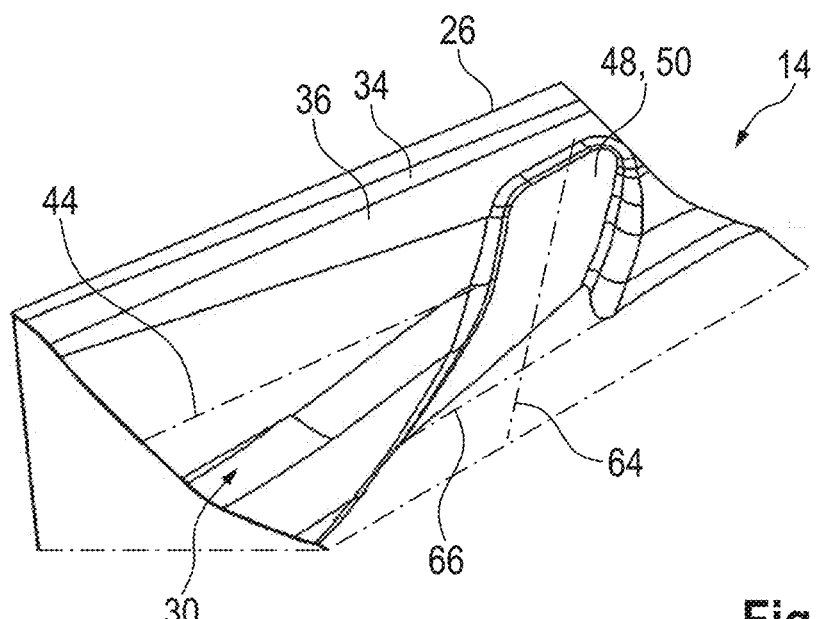

FIGS. 12 and 13 show a cutting insert 14, in which the chip breaker element 48 is configured according to one variant.

The chip guiding surface 50 now no longer extends parallel to a flute contour of the flute 30.

The chip guiding surface 50 is instead curved along two directions.

This results in a curvature along a first direction 64 because the chip breaker element 48 assumes the curvature of the contour of the flute 30.

The chip guiding surface 50 is also curved along a second direction 66, however, that corresponds substantially to the course 44 of the flute.

In other words, the chip guiding surface 50 in the second variant deviates from a straight course along the directions 64, 66.

In this variant, the spacing of the chip guiding surface 50 from the flute contour varies from 0.02 mm to 0.1 mm.

It goes without saying that the two mentioned variants of the chip guiding surface 50 can also be present in combinations.

The chip guiding surface 50 then extends both parallel to the flute contour of the flute 30 and curved along two directions. This can be the case if the flute contour is curved along two directions and the chip guiding surface 50 extends parallel to it.

The chip breaker element 48 according to the second variant also serves to place chips into a multidimensional stress state and thus cause them to break.

As already mentioned, the cutting insert 14 is implemented as an indexable insert. An underside 68 of the cutting insert 14 can therefore be configured in the same manner as the upper side 24.

The invention claimed is:

1. A cutting insert for a machining tool, comprising:
   a cutting edge connecting two corners of the cutting insert, a first chamfer proximate the cutting edge;
   a second chamfer disposed between the first chamfer and a flute, the flute having a surface defining a flute contour;
   a first chip breaker element projecting into an interior of the flute;
   a second chip breaker element disposed only in a central region approximately midway between the two corners of the cutting insert, the second chip breaker element including a chip guiding surface extending from the flute contour of the flute; and
   a chip guide finger disposed in an end region of the flute,
   wherein the first chip breaker element comprises a first chip guiding surface higher in elevation than the flute contour along an entire length of the chip guiding surface, and
   wherein the chip guide finger is positioned between one of the two corners of the cutting insert and the chip breaker element.

2. The cutting insert according to claim 1, wherein the first chip breaker element is spaced apart from a cutting edge-side edge of the flute.

3. The cutting insert according to claim 1, wherein, in plan view, the first chip breaker element includes an angle of less than 90° with respect to the cutting edge.

4. The cutting insert according to claim 1, further comprising a deflection channel on an upper side of the cutting insert for directing coolant toward the cutting edge.

5. The cutting insert according to claim 4, wherein an outlet-side end of the deflection channel is directed toward the cutting edge.

6. The cutting insert according to claim 5, wherein a central axis of the outlet-side end of the deflection channel extends parallel to a tangent to the chip breaker element.

7. The cutting insert according to claim 1, wherein the cutting insert is an indexable insert.

8. A machining tool having a cutting insert according to claim 1.

9. The machining tool of claim 8, wherein the machining tool is a turning tool.

10. A cutting insert for a machining tool, comprising:
    a cutting edge connecting two corners of the cutting insert;
    a first chamfer proximate the cutting edge;
    a second chamfer disposed between the first chamfer and a flute, the flute having a surface defining a flute contour;
    a first chip breaker element projecting into an interior of the flute;
    a second chip breaker element disposed only in a central region approximately midway between the two corners of the cutting insert, the second chip breaker element including a chip guiding surface extending from the flute contour of the flute; and
    a chip guide finger disposed in an end region of the flute,
    wherein the first chip breaker element comprises a first chip guiding surface higher in elevation than the flute contour along an entire length of the chip guiding surface,
    wherein the chip guide finger is positioned between one of the two corners of the cutting insert and the chip breaker element,
    wherein the first chamfer has a first chamfer angle, the first chamfer a first chamfer width that is substantially constant over an entire length of the first chamfer, and
    wherein the second chamfer has a second chamfer angle and a second chamfer width that continuously changes along an entire length of the second chamfer.

11. The cutting insert according to claim 10, wherein the second chamfer angle of the second chamfer proximate the two corners is more negative in magnitude than in a central region of the cutting insert.

12. The cutting insert according to claim 10, wherein the second chamfer width of the second chamfer proximate the two corners is greater in magnitude than in a central region of the cutting insert.

13. The cutting insert according to claim 10, wherein the first chamfer angle is substantially constant along the entire length of the first chamfer.

14. The cutting insert according to claim 1, wherein, in plan view, the chip guide finger is curved along a line of curvature having a radius of curvature between about 0.8 mm and about 6 mm.

15. A cutting insert for a machining tool, comprising:
    a cutting edge connecting two corners of the cutting insert;
    a first chamfer proximate the cutting edge;
    a second chamfer adjoining the first chamfer;
    a flute adjoining the second chamfer, the flute having a surface defining a flute contour;
    a first chip breaker element projecting into an interior of the flute;
    a second chip breaker element disposed only in a central region approximately midway between the two corners of the cutting insert, the second chip breaker element including a chip guiding surface extending from the flute contour of the flute; and a chip guide finger disposed in an end region of the flute adjoining one of the two corners of the cutting insert, wherein the first chip breaker element comprises a chip guiding surface higher in elevation than the flute contour along an entire length of the chip guiding surface, and wherein the first chip breaker element is formed at an angle less than 90° with respect to the cutting edge.

16. The cutting insert according to claim 15, wherein the chip guiding surface is curved in a first direction at an angle with respect to the cutting edge and in a second direction that follows a course of the flute.

\* \* \* \* \*